United States Patent
Minowa et al.

(10) Patent No.: US 6,832,935 B2
(45) Date of Patent: Dec. 21, 2004

(54) CONNECTOR FOR ELECTRIC APPARATUS

(75) Inventors: Ryota Minowa, Yamaga (JP); Keisuke Yano, Kikuchi-gun (JP); Yojiro Saruwatari, Kumamoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 10/393,715

(22) Filed: Mar. 19, 2003

(65) Prior Publication Data
US 2003/0194887 A1 Oct. 16, 2003

(30) Foreign Application Priority Data

Apr. 12, 2002 (JP) ........................................ 2002-110917

(51) Int. Cl.$^7$ ................................................ H01R 9/26
(52) U.S. Cl. .................... 439/716; 439/532; 439/282; 361/759
(58) Field of Search ................................ 439/716–719, 439/532, 282; 361/759

(56) References Cited

U.S. PATENT DOCUMENTS

| | | | | |
|---|---|---|---|---|
| 4,581,489 A | * | 4/1986 | Nozick | 379/329 |
| 5,704,805 A | * | 1/1998 | Douty et al. | 439/532 |
| 5,797,756 A | | 8/1998 | Nad | 439/94 |
| 5,803,772 A | * | 9/1998 | Muller et al. | 439/716 |
| 5,836,791 A | * | 11/1998 | Waas et al. | 439/709 |
| 5,978,193 A | * | 11/1999 | Kaaden | 361/64 |
| 6,142,802 A | * | 11/2000 | Berg et al. | 439/180 |
| 6,293,820 B1 | * | 9/2001 | Bechaz et al. | 439/532 |
| 6,322,399 B1 | * | 11/2001 | Hanning | 439/717 |
| 6,418,027 B1 | * | 7/2002 | Suzuki et al. | 361/729 |
| 6,431,909 B1 | * | 8/2002 | Nolden et al. | 439/532 |
| 6,452,780 B2 | * | 9/2002 | Kobayashi et al. | 361/308.1 |

* cited by examiner

Primary Examiner—Truc T. T. Nguyen
(74) Attorney, Agent, or Firm—Beyer Weaver & Thomas LLP

(57) ABSTRACT

A connector for an electric apparatus has a case and a base which are engaged to each other or integrally formed. The base has an elastic hook and a latch formed integrally on its bottom surface for engaging both edge parts of a rail so as to mount the connector removably to the rail. The case has side surfaces extended from the lower edges to provide extended members for covering both side surfaces of the elastic hook for providing protection against damage when the connector is accidentally dropped. Protrusions may be provided on the bottom surface of the base between the extended members and the elastic hook for limiting twisting deformation of the elastic hook. The bottom surface of the elastic hook has a curved portion for relieving any impact force that may be damaging.

10 Claims, 22 Drawing Sheets

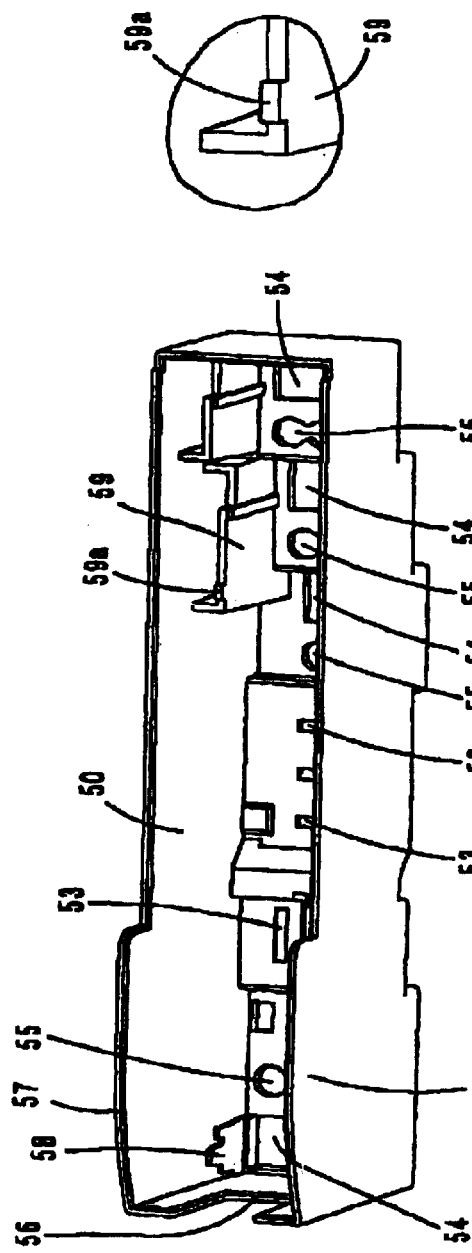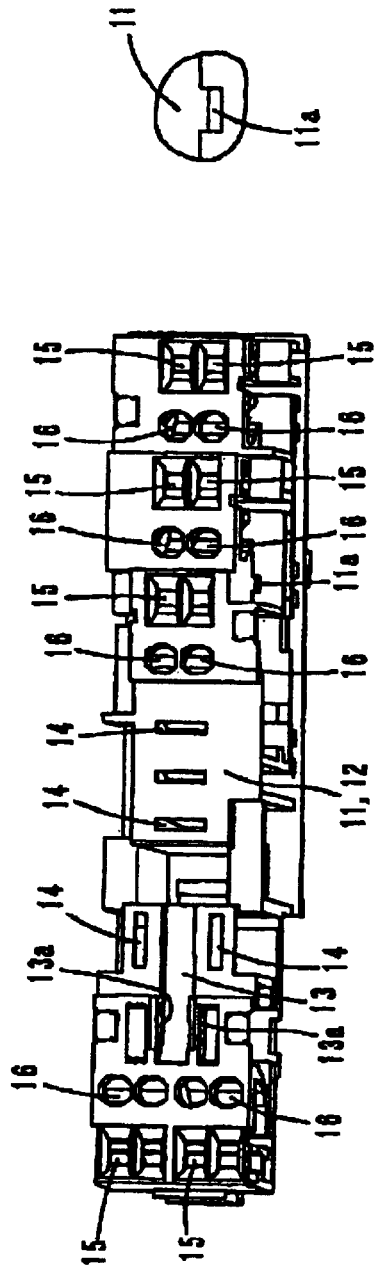

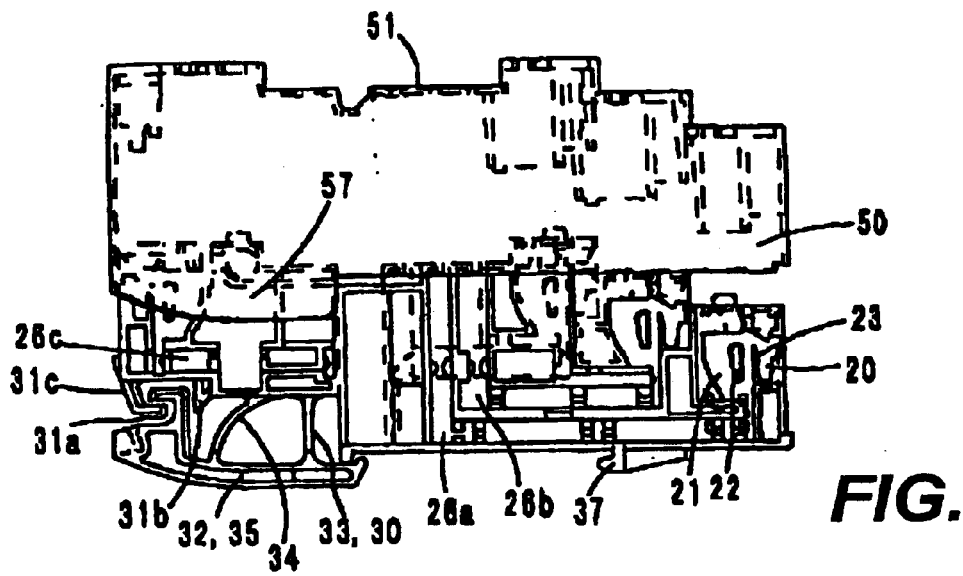
FIG. 6A
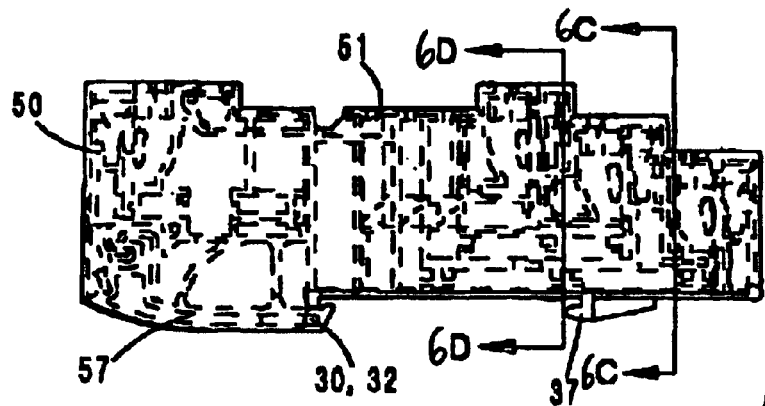
FIG. 6B
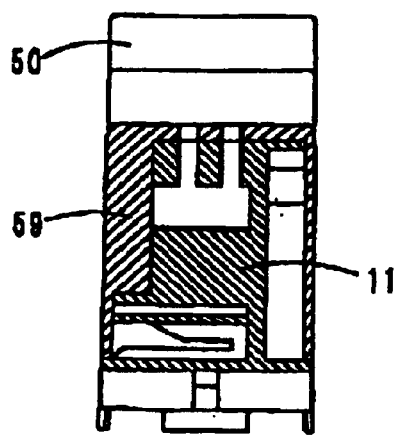 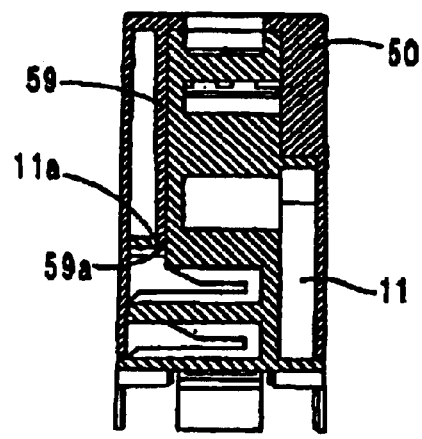
FIG. 6C  FIG. 6D

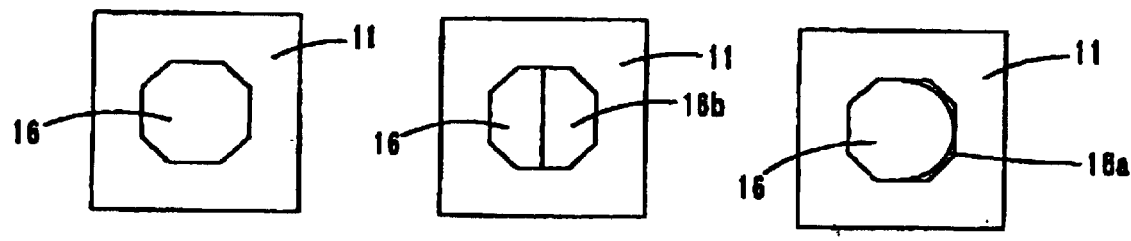
FIG. 10A  FIG. 10C  FIG. 10E
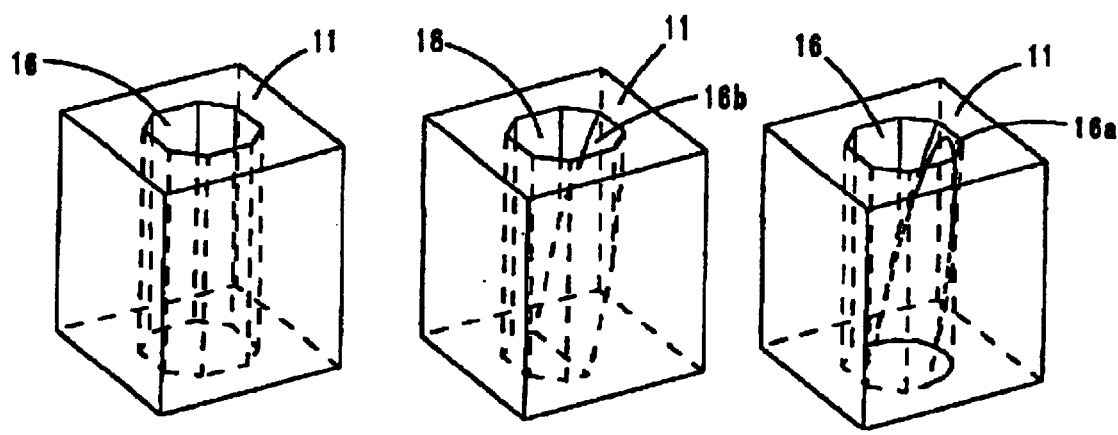
FIG. 10B  FIG. 10D  FIG. 10F

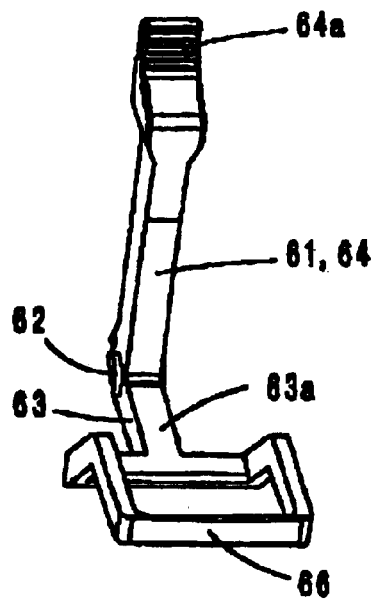 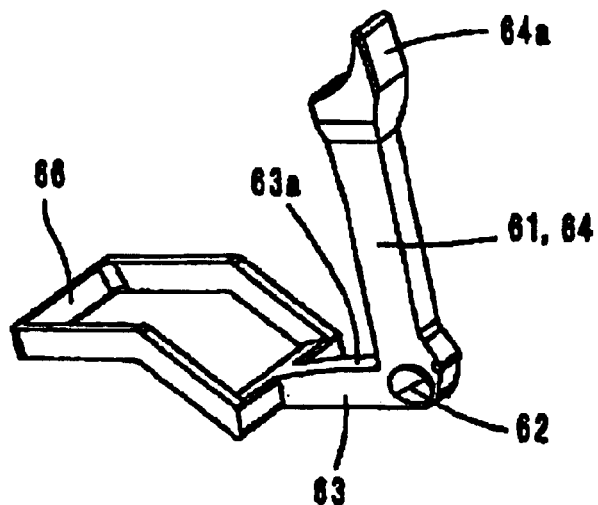
FIG. 15A  FIG. 15B
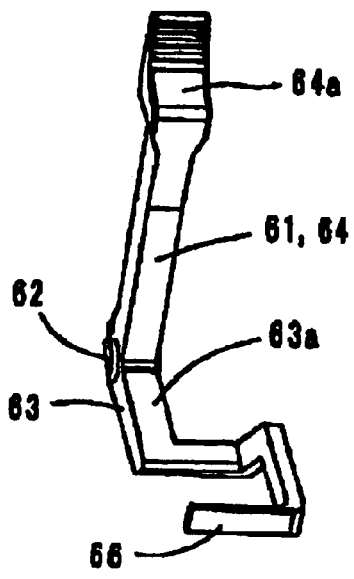 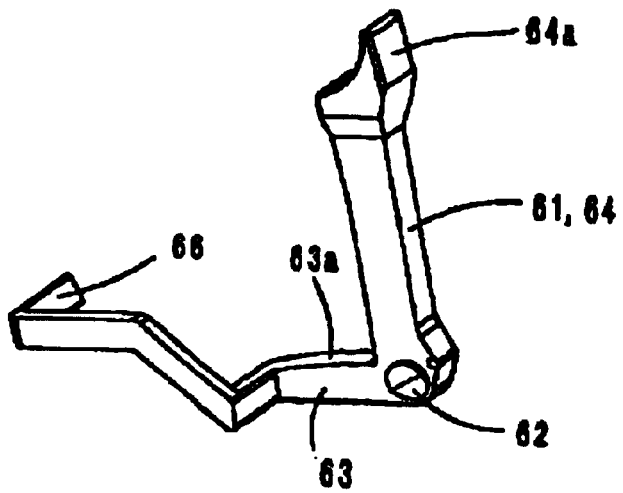
FIG. 15C  FIG. 15D

US 6,832,935 B2

CONNECTOR FOR ELECTRIC APPARATUS

BACKGROUND OF THE INVENTION

This invention relates to a connector for electrically connecting an electric apparatus such as a relay or a timer to an external circuit through lead lines. In particular, this invention relates to such a connector having an attaching mechanism for detachably attaching to a rail.

FIG. 22 shows an example of prior art connector for an electric apparatus provided with an attaching mechanism comprising an elastic hook 2 and a latch 3 on the bottom surface of a housing 1 for attaching to a rail (not shown) by engaging to both of its edge parts such that a plurality of such connectors can be detachably attached in parallel to the rail. Because the elastic hook 2 protrudes downward from the housing 1, it is easily breakable if the connector is dropped accidentally and especially if the force of impact has a twisting effect. For this reason, it may be considered to make the housing 1 with a nylon resin material which is highly shock-resistant and to form the elastic hook 2 integrally with the housing 1, but nylon resins are easily deformable with temperature and it is difficult to obtain a desired level of electrical insulation characteristic.

SUMMARY OF THE INVENTION

It is therefore an object of this invention, in view of the problem with such a prior art connector, to provide an improved connector for an electric apparatus having a mechanism for attaching to a rail and not easily damaged when dropped.

A connector according to this invention, with which the above and other objects can be accomplished, may be characterized as comprising a case and a base to be engaged or integrally formed together and wherein the base has an elastic hook and a latch formed integrally on its bottom surface for engaging both edge parts of a rail so as to mount the connector removably to the rail, and wherein the case has extended members extending from its lower edge parts for covering both side surfaces of the elastic hook and thereby protecting the elastic hook from damage. With a connector thus structured, these extended members protect the elastic hook even if the connector is accidentally dropped such that the elastic hook is not easily damaged. In other words, the elastic hook need not be made of nylon resin or the like and hence the freedom in design is increased.

As an example of the embodiment of the invention, at least one protrusion may be provided on the bottom surface of the base between the extended members on the case and the elastic hook for limiting twisting deformation of the elastic hook. With such a protrusion or protrusions additionally provided, the damage to the elastic hook by a twisting deformation can be more effectively prevented. In particular in the case of a connector with a housing having the case and the base formed integrally and having an elastic hook and a latch molded integrally on the bottom surface for engaging edge parts of a rail, such extended members and protrusions can effectively control the effect of a twisting force and protect the elastic hook from being damaged.

As another example of the embodiment of the invention, an external side portion of the bottom surface of the elastic hook may be arcuately curved. Such an curved surface serves to distribute and relieve the effect of an impact force, say, when the connector is accidentally dropped, and the damage to the connector can be prevented even more effectively.

As still another example of the embodiment of the invention, an opening may be provided to the case through which the elastic hook can be operated upon. If the case has four side surfaces and two of these four side surfaces are extended to provide aforementioned extended members, such an opening may be formed in another side surface adjacent to those with an extended member. Such an opening may serve to allow a tool to pass therethrough for removing the rail attached to the connector from the elastic hook. This makes the work much easier for removing the attached rail.

It is preferable to form the aforementioned opening with edge parts such that the side surfaces of the elastic hook contact them when the case and the base are engaged together because this will prevent the elastic hook from being subjected to a twisting force and the elastic hook can be further dependably protected from the effect of a twisting force in a simple manner.

It is further preferable to provide the base with an indentation and an outward facing guide surface for guiding the aforementioned tool to the indentation for operating on the elastic hook and to position this outward facing guide surface so as to be visible through the opening. This makes it much easier to insert the tool into the opening so as to bring its tip into the indentation for operating on the elastic hook to release the connector from the rail.

BRIEF DESCRIPTION OF THE DRAWINGS

FIGS. 5A, 5B, 5C and 5D, together referred to as FIG. 5, are respectively a diagonal view of the case taken from a different direction, an enlarged portion of FIG. 5B, a diagonal view of the base taken from a different direction, and an enlarged portion of FIG. 5C.

FIGS. 6A, 6B, 6C and 6D, together referred to as FIG. 6, are respectively a front view of the connector of FIG. 1 when the case is being engaged to the base, a front view when the case has been engaged to the base, a sectional view taken along line 6C—6C of FIG. 6B and a sectional view taken along line 6D—6D of FIG. 6B.

FIGS. 10A, 10B, 10C, 10D, 10E and 10F, together referred to as FIG. 10, are drawings for explaining the shape of the handling bar hole, FIGS. 10A and 10B being respectively a plan view and a diagonal view at an initial step of its formation, FIGS. 10C and 10D being respectively a plan view and a diagonal view at an intermediate step, and FIGS. 10E and 10F being respectively a plan view and a diagonal view at a final step.

FIGS. 15A, 15B, 15C and 15D, together referred to as FIG. 15, are diagonal views of still other levers embodying this invention.

Throughout herein, comparable or like components are indicated by the same numerals even where they are components of different connectors and may not be repetitiously described.

DETAILED DESCRIPTION OF THE INVENTION

Figure 1:
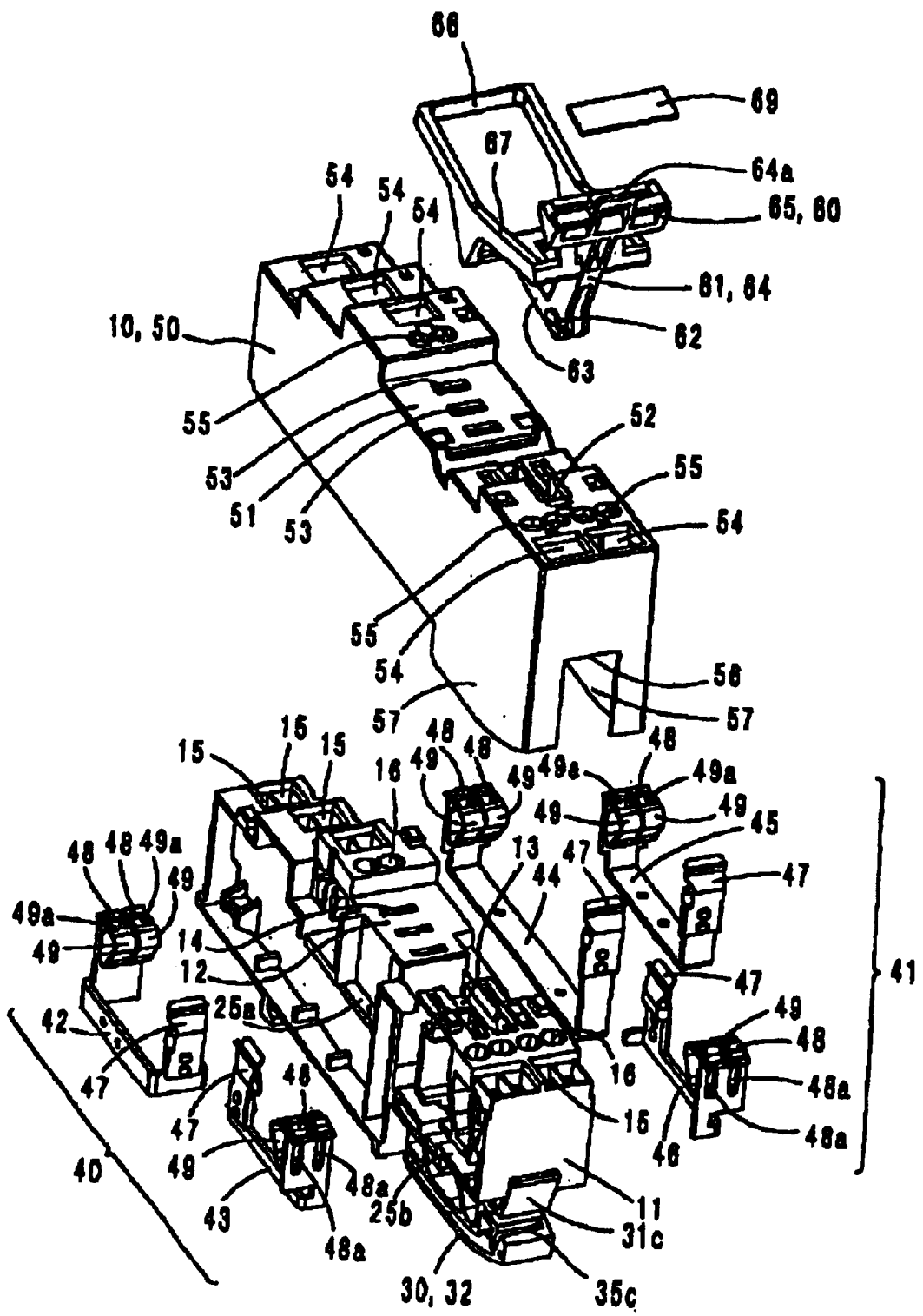
FIG. 1 is an exploded diagonal view of a connector embodying this invention for an electric apparatus.
Figure 2A:
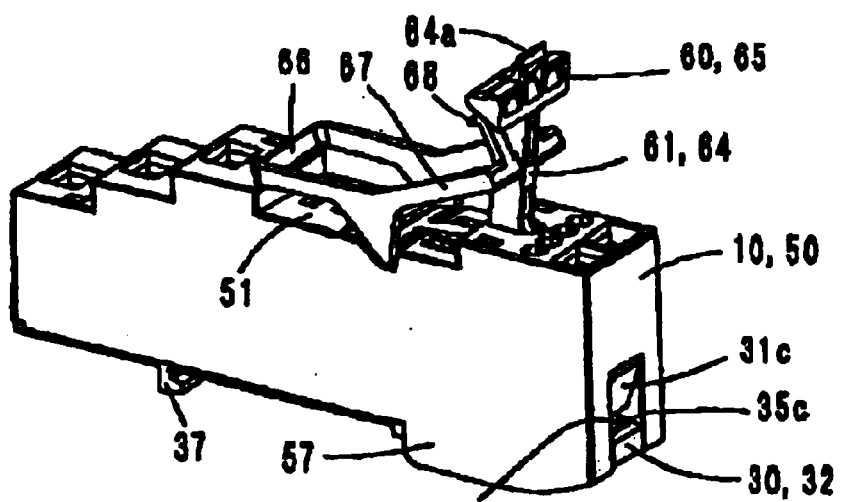
FIGS. 2A, 2B and 2C, together referred to as FIG. 2, are diagonal views of the connector of FIG. 1 for showing how it is used.
Figure 2B:
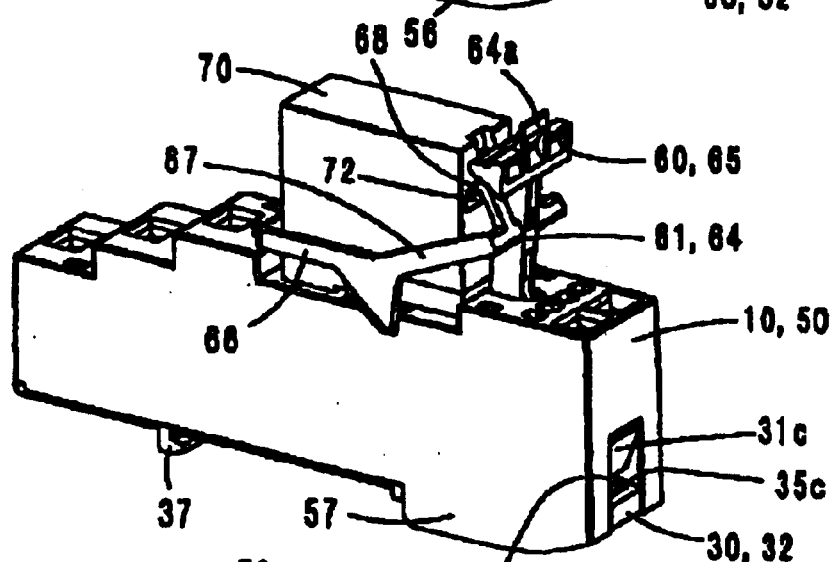
Figure 2C:
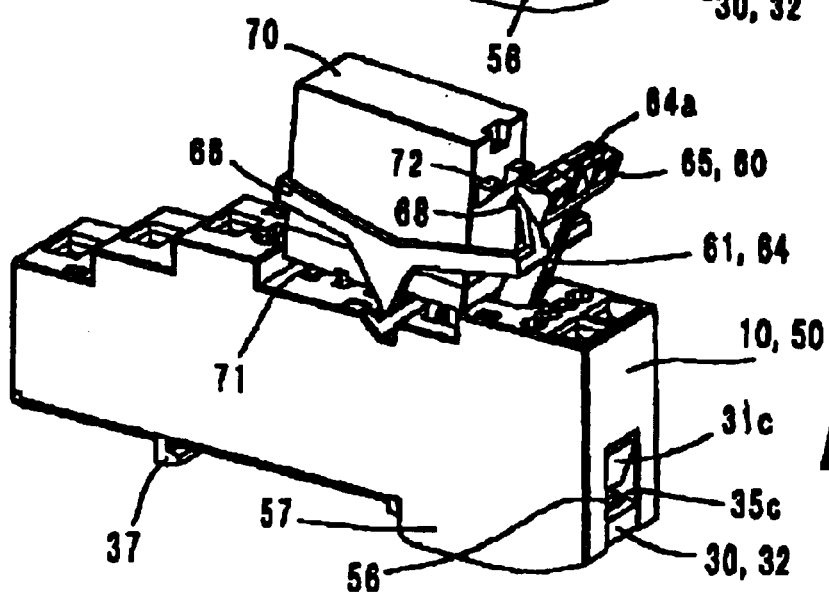

The invention is described next with reference to FIGS. 1–21 showing a connector 10 for mounting a one-pole relay. As shown in FIG. 1, this connector 10 is comprised of a base 11, connecting mechanisms 40 and 41 attached to both sides of this base 11, a case 50 which engages with the base 11 and a lever 60 which is rotatably attached toward one side of the upper surface of the base 11.

The base 11 is a molded resin product having a rail attachment mechanism 30 integrally formed on its bottom surface. An indentation 12 for mounting therein a relay (shown at 70 in FIGS. 2B and 2C) is formed in the middle on the top surface of the base 11. Steps are formed on the top surface of the indentation 12 toward one side. A groove 13 for inserting the lever 60 is formed at the bottom of the indentation 12, and a plurality of terminal-accepting holes 14 for accepting the terminals 71 (shown in FIG. 13C) of the relay 70 are provided near the groove 13.

Figure 8A:
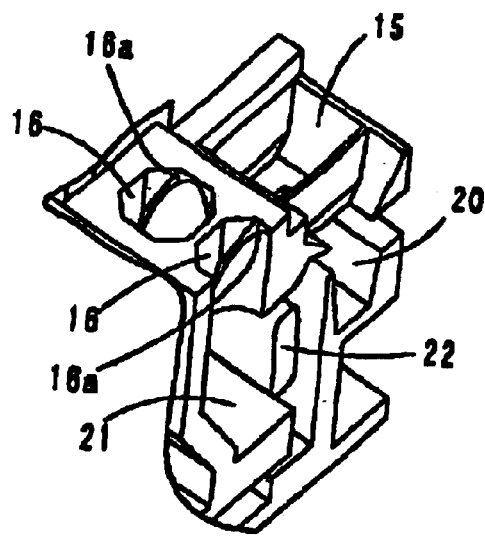
FIGS. 8A, 8B, 8C and 8D, together referred to as FIG. 8, are respectively an enlarged diagonal view of a portion of the base shown in FIG. 1, its sectional view, an enlarged diagonal view of another base and its sectional view.
Figure 8B:
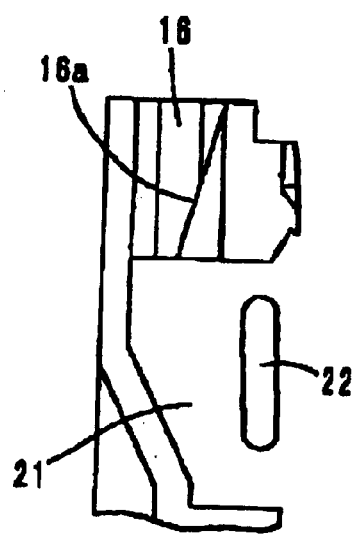
Figure 8C:
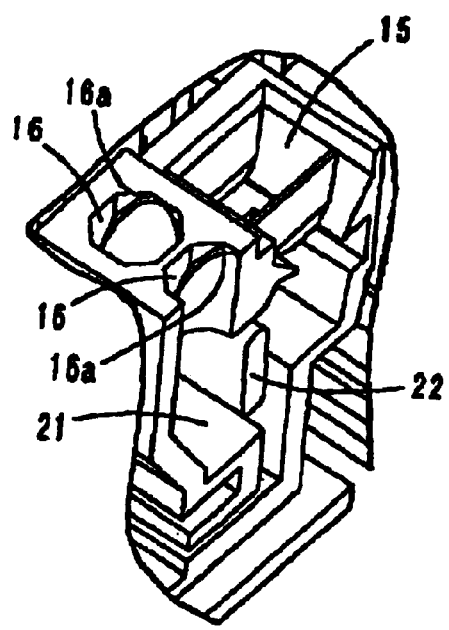
Figure 8D:
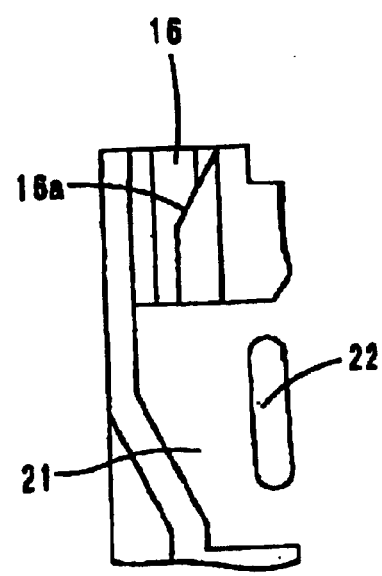
Figure 9A:
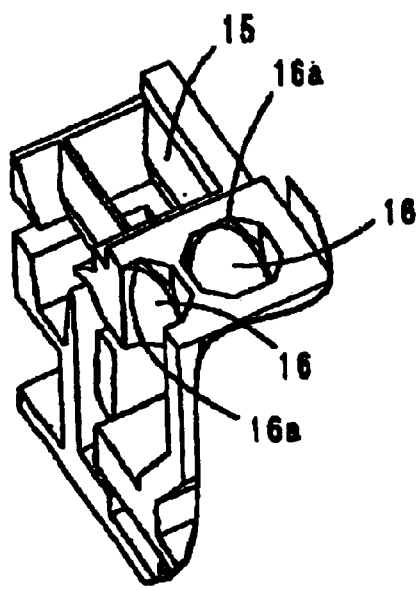
FIGS. 9A, 9B, 9C and 9D, together referred to as FIG. 9, are respectively an enlarged diagonal view of a portion of a different base, its sectional view, an enlarged diagonal view of a portion of still another base, and its sectional view.
Figure 9B:
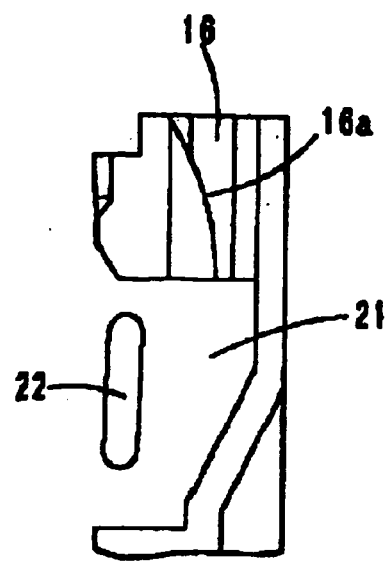
Figure 9C:
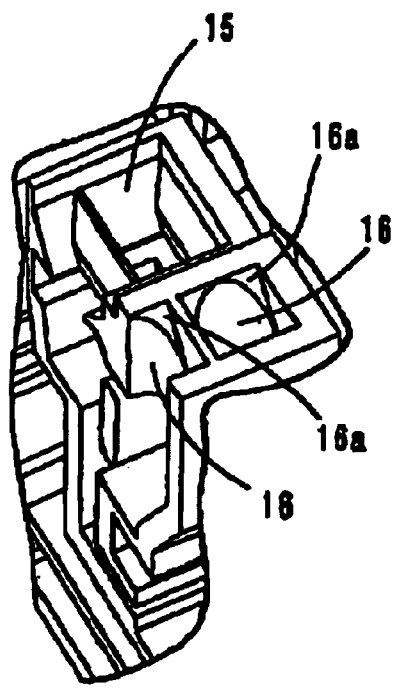
Figure 9D:
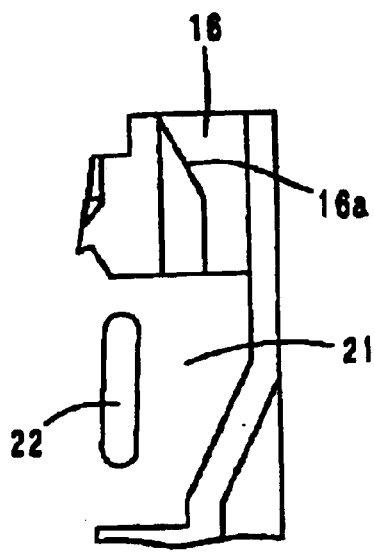

Lead line holes 15 for inserting lead lines and handling bar holes 16 for inserting a handling bar 80 are provided on the top surface of the base 11 on both sides of the indentation 12 at a specified pitch. As shown in FIG. 8, a guide surface 16a for guiding the handling bar 80 is formed inside each handling bar hole 16. The guide surface 16a is formed by forming a tapered flat surface 16b as shown in FIGS. 10C and 10D inside a sectionally octagonal straight hole 16 shown in FIGS. 10A and 10B and then cutting the tapered surface 16b as shown in FIGS. 10E and 10F. The guide surface 16a is not required to extend to the bottom opening of the hole 16 but may extend only partially, as shown in FIGS. 8C and 8D. Alternatively, as shown in FIGS. 9A and 9B, the guide surface 16a may be formed with a curved surface. As shown in FIGS. 9C and 9D, furthermore, the guide surface 16a may be formed from a sectionally square-shaped hole 16, extending only partially to the bottom.

Directly below the lead line holes 15, a U-shaped pocket 20 is prepared, as shown in FIG. 7 for collecting scraps of lead lines which may be generated when the lead lines are forcibly pulled out. Directly below the handling bar holes 16, a storage space 21 is prepared for a clamp spring 49. A stopper 22 for limiting the elastic deformation and preventing plastic deformation of the clamp spring 49 protrudes into this storage space 21.

Partition walls 23 for the pockets 20 are formed opposite to and at a specified distance from the stopper 22 so as to be adjacent to end parts of metal fittings 42–46 (of connecting mechanisms 40 and 41 to be described below) such that the end parts of the metal fittings 42–46 are clamped between one of the partition walls 23 and a corresponding one of the stoppers 22.

As shown in FIG. 1, grooves 25a and 25b are formed on one side surface of the base 11 for pushing the metal fittings 42 and 43s of the connecting mechanism 40 respectively thereinto from one side. Similar grooves 26a, 26b and 26c are formed, as shown in FIG. 6, on the opposite side surface of the base 11 for pushing the metal fittings 44, 45 and 46 of the connecting mechanism 41 respectively thereinto from the opposite side. The upper part on one side of each of these grooves 25a, 25b, 26a, 26b and 26c is connected to one of the terminal-accepting holes 14, while the upper part on the other side of these grooves 25a, 25b, 26a, 26b and 26c is connected to the corresponding U-shaped pocket 22 and storage space 21.

Figure 3:
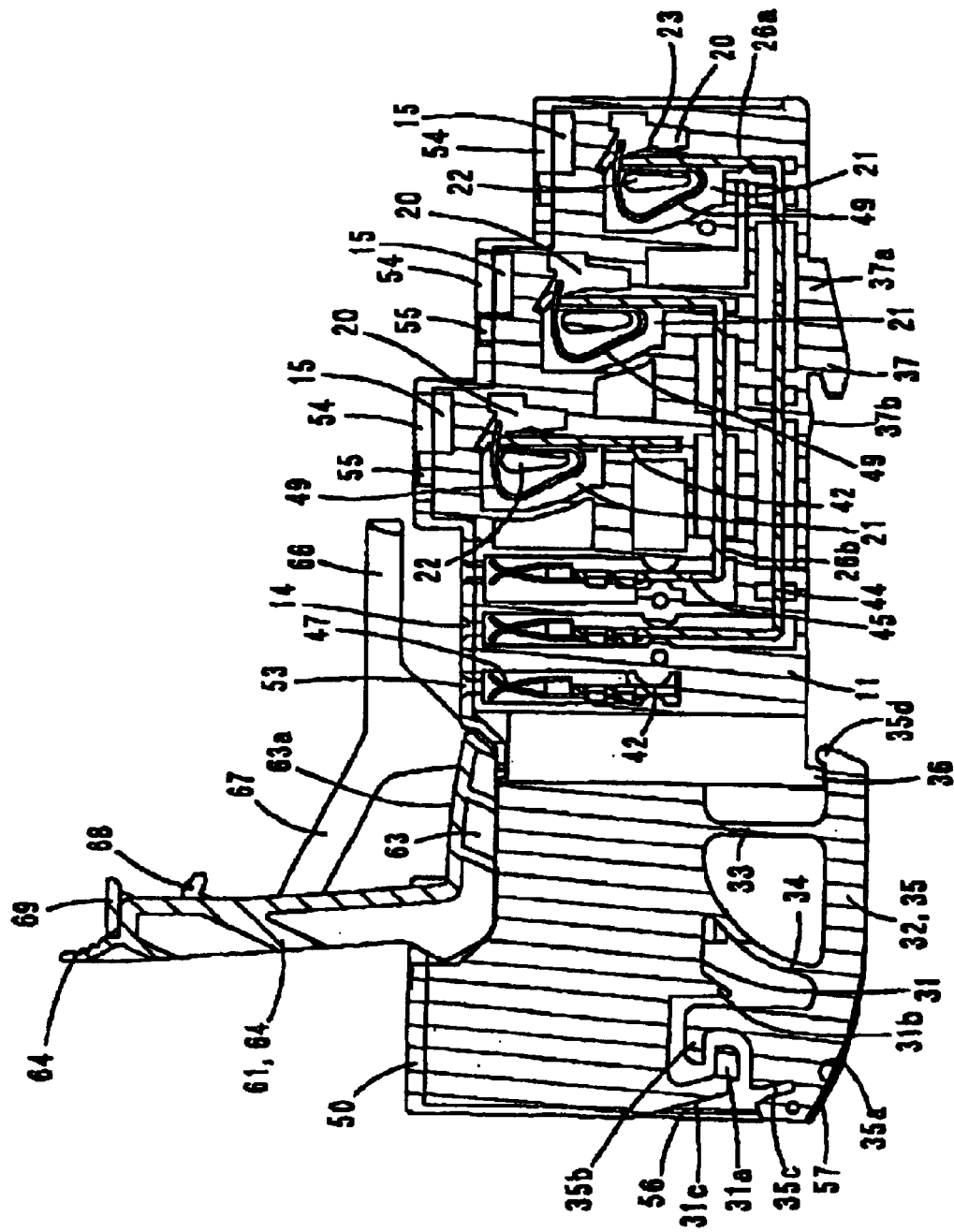
FIG. 3 is a longitudinal sectional view of the connector of FIG. 1.
Figure 4A:
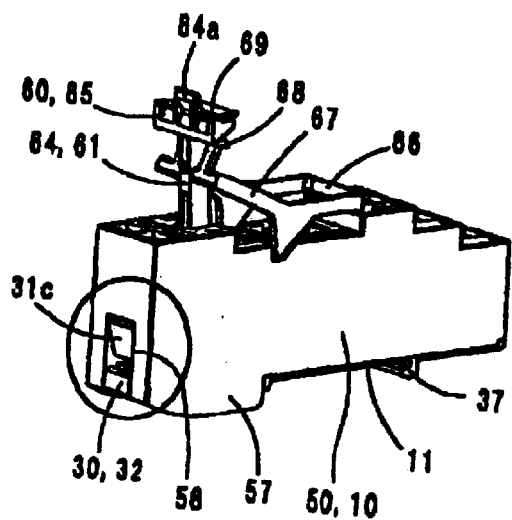
FIGS. 4A, 4B and 4C, together referred to as FIG. 4, are respectively a diagonal view of the connector of FIG. 1 taken from a different angle, an enlarged diagonal view of its portion and a sectional view of a portion of FIG. 4A.
Figure 4B:
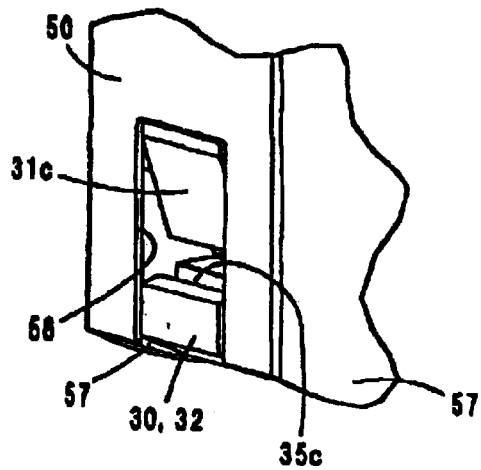
Figure 4C:
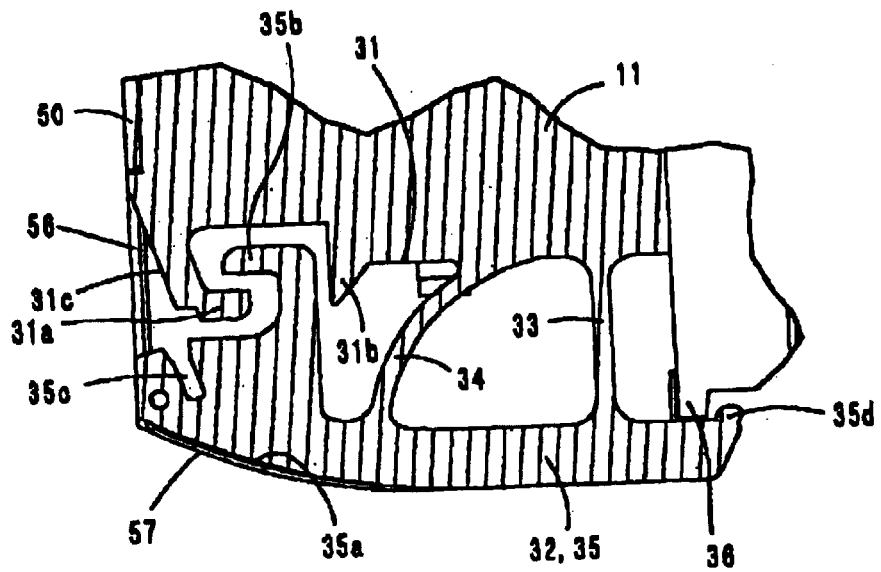
Figure 7A:
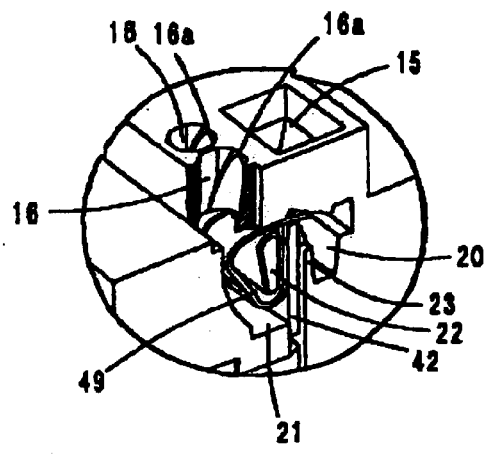
FIGS. 7A, 7B, 7C and 7D, together referred to as FIG. 7, are enlarged views of a portion of the connector of FIG. 1 for showing how it is used with a handling bar.
Figure 7B:
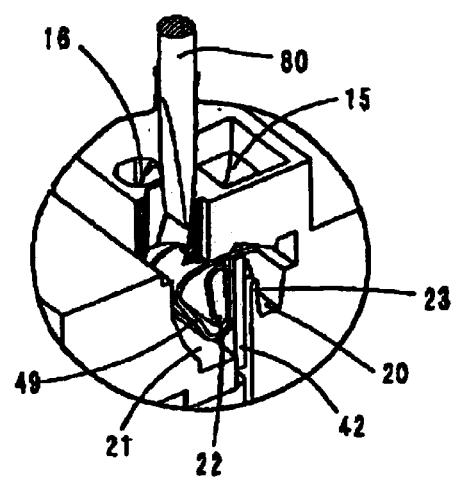
Figure 7C:
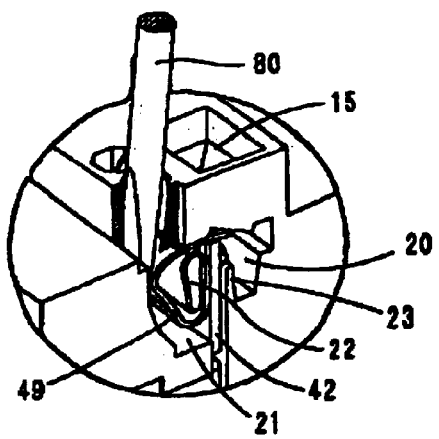
Figure 7D:
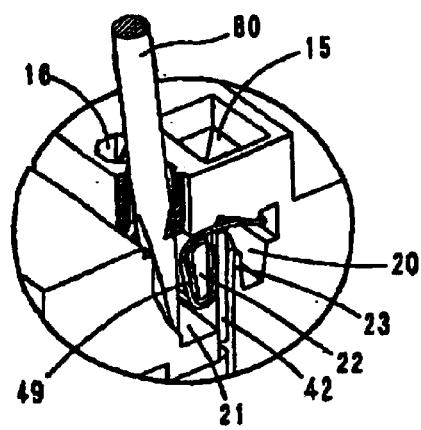

The rail attachment mechanism 30 is formed, as shown in FIGS. 3 and 4, by forming a stepped part 31 on one side of the bottom surface of the base 11 and having an elastic hook 32 protruding downward from the ceiling of the stepped part 31. This elastic hook 32 is integrally formed as a single body with the base 11 by connecting a movable horizontal latch part 35 at the bottom ends of a pair of straight and arched leg parts 33 and 34. The latch part 35 has a curved surface 35a on the bottom towards one end, a protrusion 35b on the upper surface for engagement and an indentation 35c at its base.

The protrusion 35b for engagement is adapted to contact both a latch part 31a and a stopper 31b protruding from the stepped part 31 for preventing the hook 32 from being damaged when the connector 10 is dropped. The indentation 35c is for inserting a removal tool for removing the connector 10 from a rail (now shown). The latch part 31a has an outwardly facing surface 31c which is inclined so as to guide the removal tool into the indentation 35c provided on the extension of this inclined surface 31c.

Another protrusion 35d is formed on the opposite end part of the horizontal latch part 35. An elongated downward protrusion 36 is formed on the bottom surface of the base 11 such that an edge part of a rail (not shown) can be engaged with the base 11, being slidably sandwiched between these protrusions 35d and 36.

FIG. 3 also shows that the bottom surface of the base 11 on the opposite side is further provided with a latch part 37 formed as a single body with the base 11 parallel to and at a specified distance from the aforementioned protrusion 36. This latch part 37 is provided with a reinforcing rib 37a and a protrusion 3b near by for preventing rattling when it is mounted onto the rail.

The (first) connecting member 40 is comprised of (first and second) metal fittings 42 and 43 for connecting the terminals 71 of the relay 70 to lead lines (not shown). The (second) connecting member 41 is comprised of (third, fourth and fifth) metal fittings 44, 45 and 46. The second and fifth metal fittings are shaped in plane symmetry with respect to each other.

Each of these metal fittings 42–46 has a socket structure 47 locked to the top end of one of vertically rising parts and the top end of the other vertically rising part split into two parts in the direction of the width and folded to form bent parts 48. Each of the bent parts 48 is provided with a clamp spring 49. Holes 48a are formed below these bent parts 48 for supporting the metal fittings 42–46 when the clamp springs 49 are attached. Each of the clamp springs 49 has a connection hole 49a near one of its end parts of an elongated elastic plate and is bent into a nearly annular shape. The other end part of the clamp spring 49 engages the inner side of the bent part 48 of the corresponding one of the metal fittings 42–46. The connection hole 49a engages the bent part 48 such that the inner edge of the connection hole 49a engages the outer side of the bent part 48. The inner edge of the connection hole 49a of the clamp spring 49 is biased by its own elastic force and is pressed against the outer side surface of the bent part 48.

Thus, the metal fittings 42–46 can be pressed into the grooves 25a, 25b, 26a, 26b and 26c of the base 11 from its sides and the clamp springs 49 become contained inside the storage spaces 21 of the base 11, the stoppers 22 becoming engaged therewith. At the same time, the holes 48a through the metal fittings 42–46 are blocked by the partition walls 23 such that scraps of lead lines are prevented from falling therethrough into the neighboring storage space 21. The aforementioned socket structure 47 is positioned directly below the terminal-accepting holes 14, and the clamp springs 49 are directly below the handling bar holes 16.

As shown in FIG. 1, the case 50 is a molded product in the shape of a box engageable with the base 11. An indentation 51 for mounting therein the relay 70 is formed in the middle on the top surface of the case 50. Steps are formed on the top surface of the indentation 51 at one side. A slit 52 for inserting the lever 60 is formed at the center of the bottom surface of the indentation 51, and a plurality of terminal-accepting holes 53 are provided around the slit 52. Lead line holes 54 for inserting lead lines and handling bar holes 55 for inserting the handling bar 80 are provided on the top surface on both sides of the indentation 51 at a specified pitch.

As shown in FIG. 4, an end portion of an edge surface of the case 50 is cut open to form an opening 56. Both sides of the opening 56 contact a side edge part of the elastic hook 32 when the case 50 is engaged with the base 11 such that the elastic hook 32 is prevented from becoming twisted and damaged. The opening 56 also allows the user to see the outwardly facing surface 31c of the latch part 31a therethrough such that the aforementioned removal tool (not shown in FIG. 4) can be easily slid along this outwardly facing surface 31c into the indentation 35c. The side walls of the case 50 have downwardly extended portions 57 for protecting the elastic hook 32 from an impact force, having lower edges contoured along the bottom surface of the elastic hook 32.

As shown in FIG. 5, the case 50 is further provided with a protrusion 58 in its interior. This protrusion 58 is shaped so as to be engageable with the sideward opening of the U-shaped pocket 20 of the base 11. A partition wall 59 is also formed inside for closing the pocket 20 and the storage space 21 for the clamp spring 49. This partition wall 59 is formed with a protrusion 59a on its lower edge for being engagingly inserted into an opening 11a in the base 11.

As the case 50 is engaged with the base 11, the lead line holes 15 and the handling bar holes 16 of the base 11 come to communicate respectively with the lead line holes 54 and the handling bar holes 55 of the case 50. At the same time, the protrusion 58 inside the case 50 engages and blocks the side opening of the pocket 20 of the base 11, while the side opening of the adjacent pocket 20 and storage space 21 is blocked by the partition wall 59 of the case 50. In particular, since the protrusion 59a from the partition wall 59 engages the opening 11a in the base 11, the partition wall 59 is prevented from warping outward. Thus, no gap is generated between the outer side surface of the base 11 and the inner side surface of the case 50. This serves to prevent scraps of lead lines collected in the pocket 20 from falling along the inner side surface of the partition wall 59 and thereby causing defective insulation.

Figure 11A:
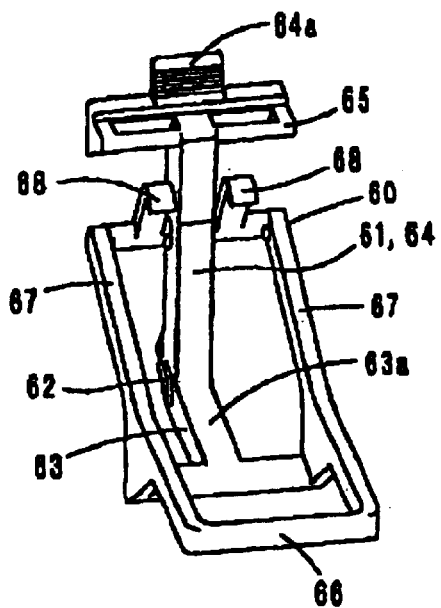
FIGS. 11A, 11B and 11C, together referred to as FIG. 11, show the lever of FIG. 1, FIGS. 11A and 11B being its diagonal views and FIG. 11C being its front view.
Figure 11B:
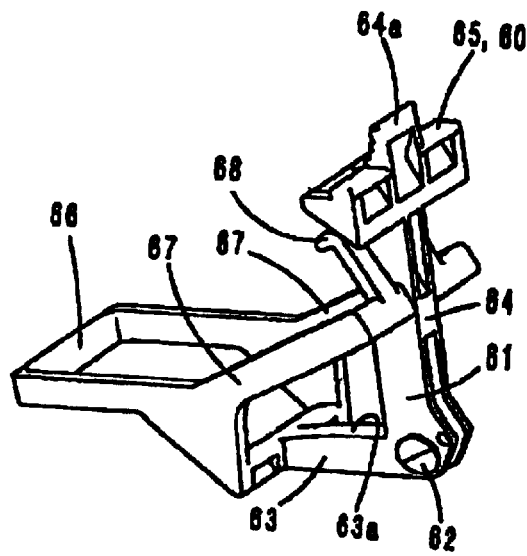
Figure 11C:
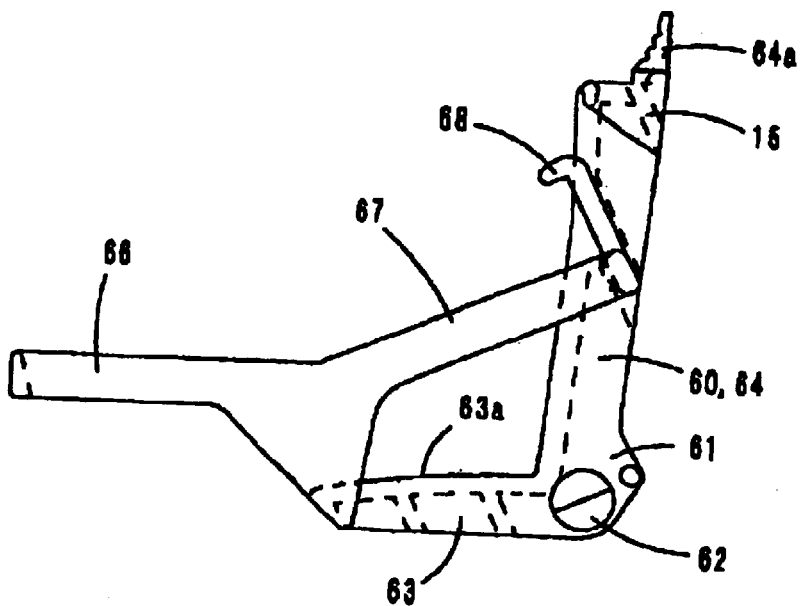
Figure 12A:
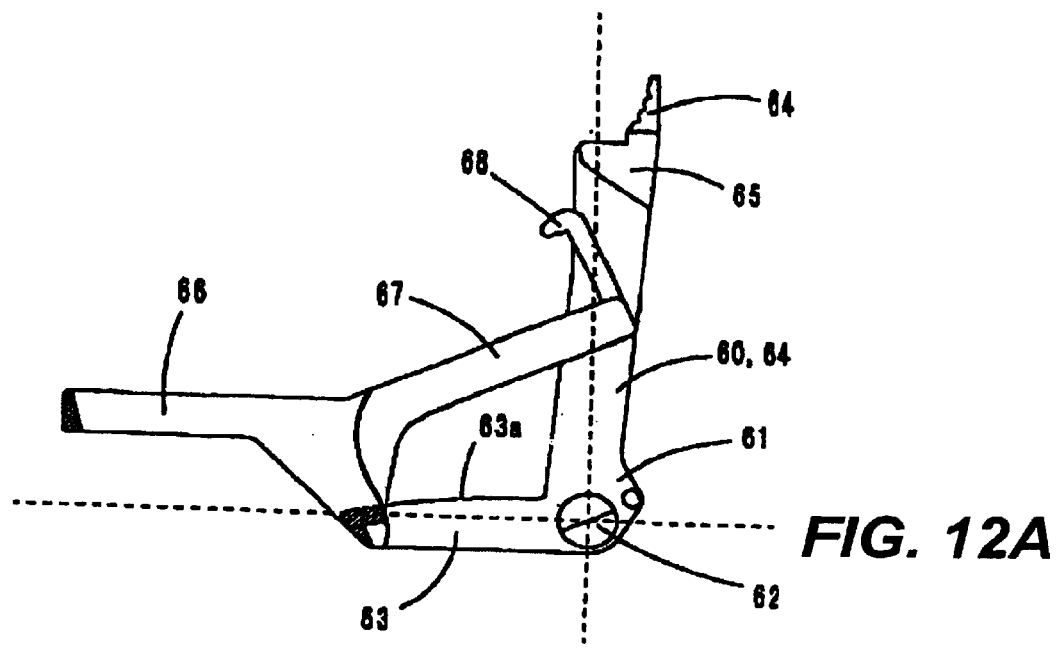
FIGS. 12A and 12B, together referred to as FIG. 12, are front views of the lever for showing its motion in operation.
Figure 12B:
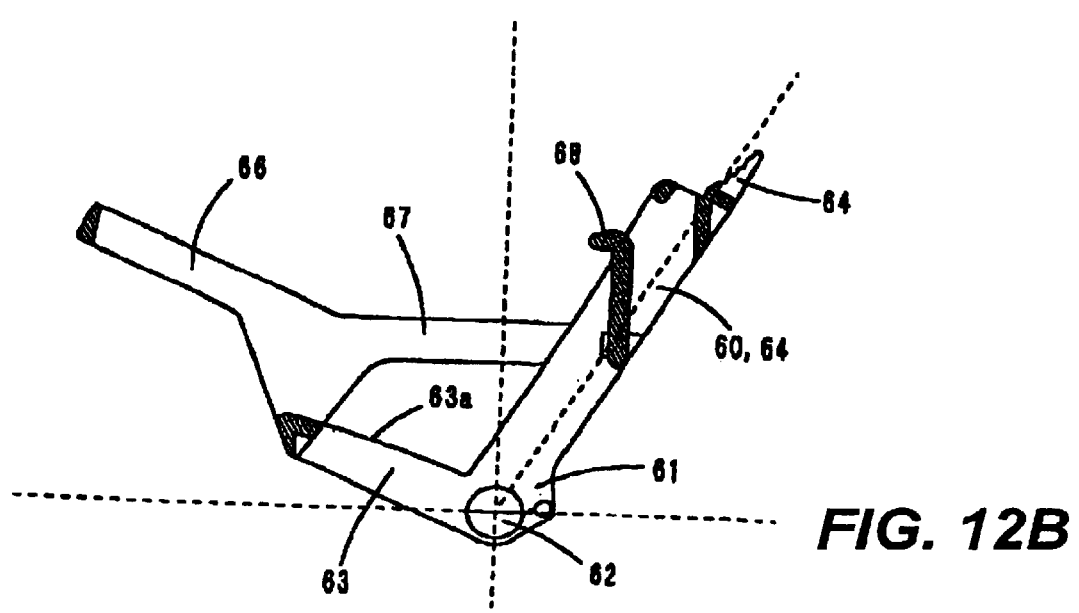

As shown in FIGS. 11 and 12, the lever 60 has a main body 61 which is L-shaped as seen from the forward direction. Rotary shafts 62 protrude coaxially from both side surfaces of the lever main body 61 at its angle-forming part. The horizontal arm 63 of the main body 61 has a curved upper surface 63a for smoothly pushing up the relay 70. The vertical arm 64 has an integrally formed attachment part 65 for attaching a removable name plate 69 (shown in FIG. 1) thereon. The name plate 69 thus positioned near the top end part 64a of the vertical arm 64 is convenient because it can be easily seen by the user. If necessary, the name plate 69 may be attached on the front side or back side of the vertical arm 64.

A frame structure 66 for limiting the tilting motion of the electric apparatus (such as the relay 70) is provided, extending from the horizontal arm 63. This frame structure 66 and the vertical arm 64 are connected by a pair of connecting arms 67. Two latches 68 protrude beside the vertical arm 64 and from the connecting arms 67, as shown in FIGS. 11 and 12.

The lever 60 is inserted into the groove 13 on the base 11 through the slit 52 in the case 50 such that it engages the openings 13a on both side surfaces of the groove 13, as shown in FIG. 5C, and becomes rotatably supported by the base 11. With the lever 60 in this tilted condition, the relay 70 is inserted into the frame structure 66 from above and pushed further downward into the socket structures 47. As a result, the lever 60 is rotated and the latches 68 come to be engaged with positioning protrusions 72 from side surfaces of the relay 70, as shown in FIG. 13, such that the relay 70 is prevented from moving up, rattling or falling off.

Figure 13A:
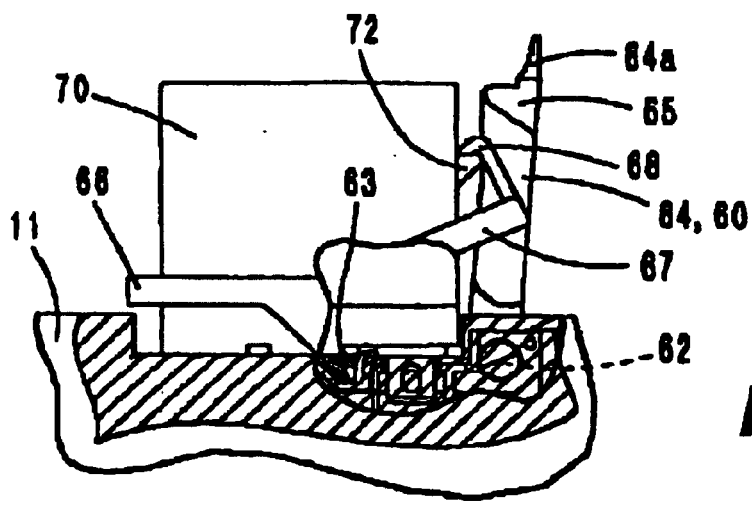
FIGS. 13A, 13B and 13C, together referred to as FIG. 13, are partially sectional views of the lever of FIG. 11 for showing the method of using it.
Figure 13B:
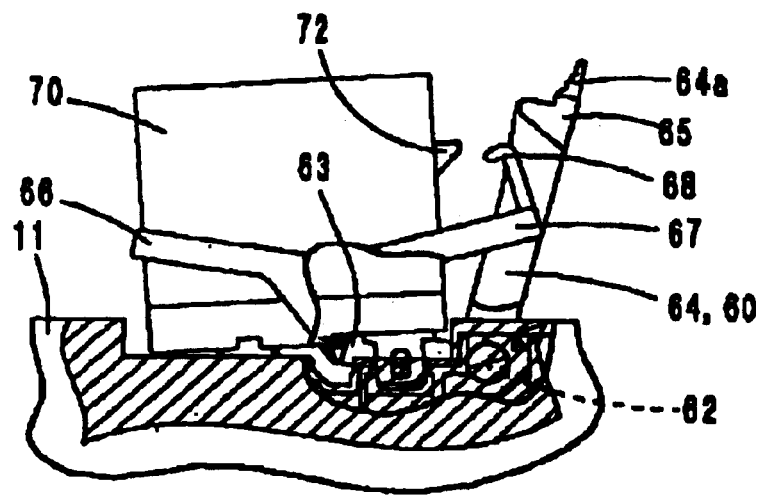
Figure 13C:
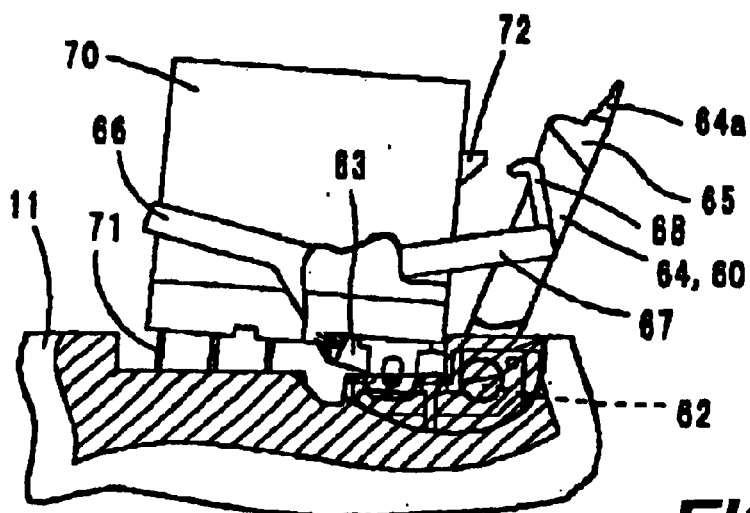

When the relay 70 is removed from the connector 10, the lever 60 is rotated as shown in FIG. 13 such that the base portion of the horizontal part 63 pushes the edge parts of the bottom surface of the relay 70 upward, causing the latches 68 on the lever 60 to disengage from the positioning protrusions 72 on the relay 70. As the lever 60 is further rotated, the point of contact moves towards the tip of the horizontal arm 63 and the relay 70 is pushed upward while being tilted. As the lever 60 is rotated by a certain angle, the frame structure 66 comes to contact the side surface of the relay 70 opposite and away from the vertical arm 64, as shown in FIG. 13B, such that the relay 70 is lifted up from the opposite side, as shown in FIG. 13C. Thus, the relay 70 can be lifted up and removed from the connector 10 smoothly as a whole without tilting excessively and hence without bending the terminals 71.

Figure 14A:
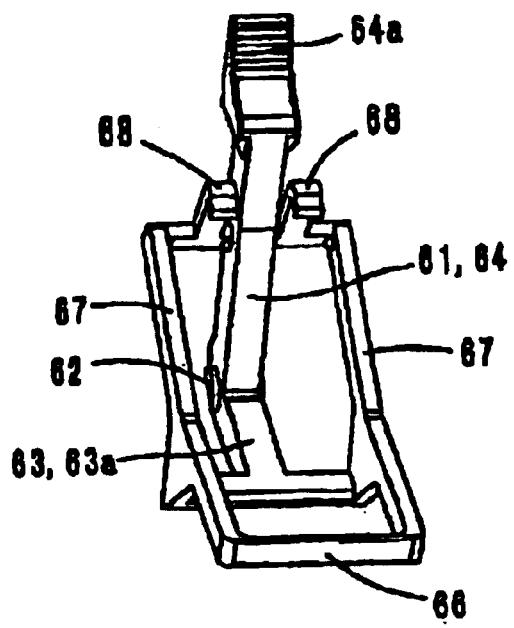
FIGS. 14A, 14B, 14C and 14D, together referred to as FIG. 14, are diagonal views of other levers embodying this invention.
Figure 14B:
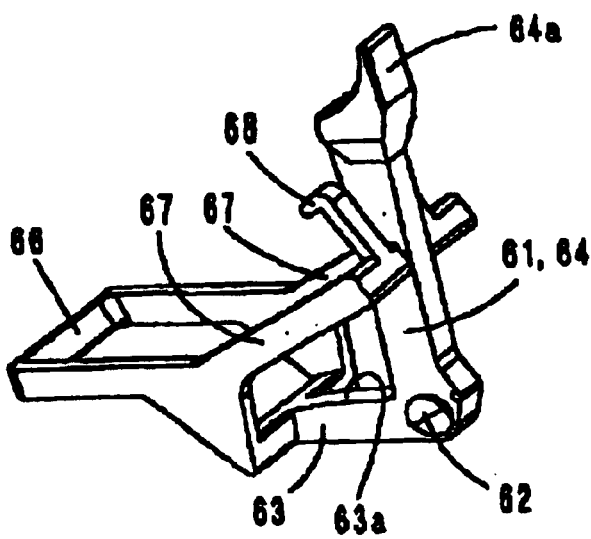
Figure 14C:
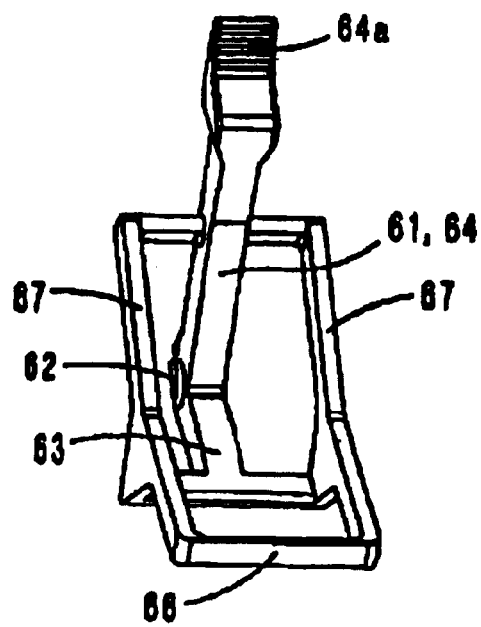
Figure 14D:
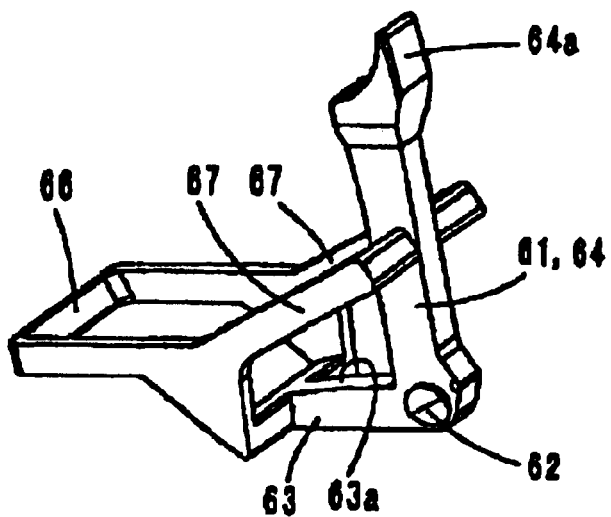
Figure 16A:
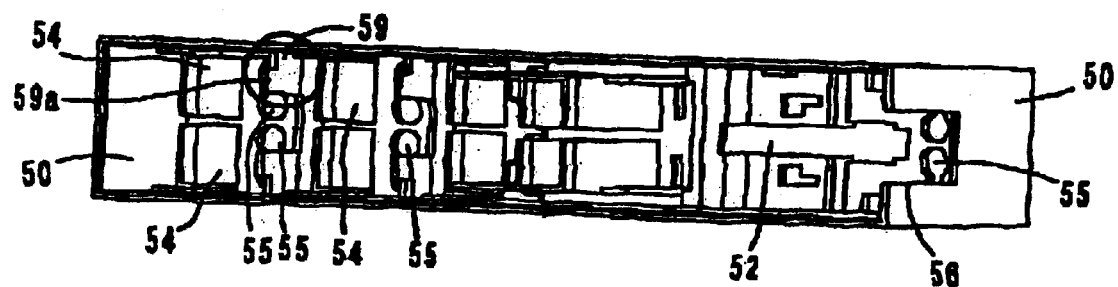
FIGS. 16A, 16B, 16C, 16D and 16E, together referred to as FIG. 16, show another connector embodying this invention, FIG. 16A being a diagonal view of its case, FIG. 16B being an enlarged view of a portion thereof, FIG. 16C being a diagonal view of its base, FIG. 16D being an enlarged view of a portion thereof, and FIG. 16E being a diagonal view of its base taken from a different direction.
Figure 16C:
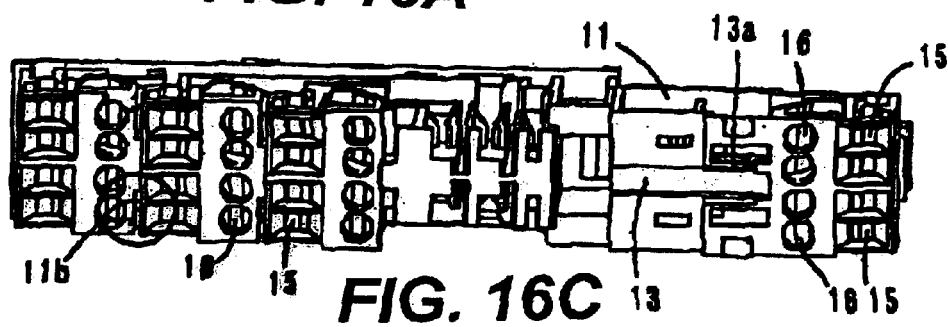
Figure 16E:
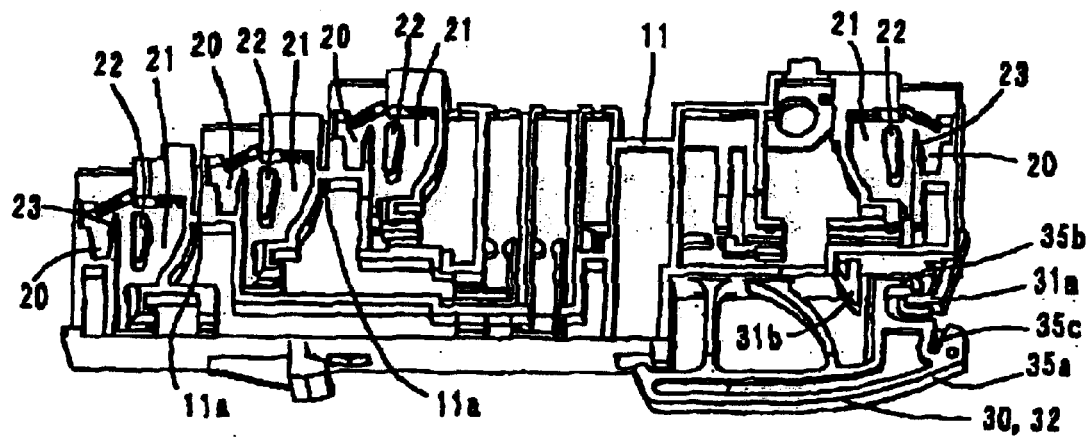
Figure 16B:
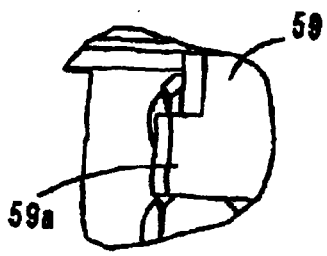
Figure 16D:
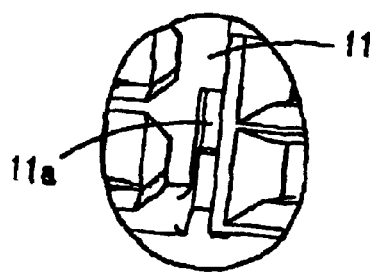
Figure 17A:
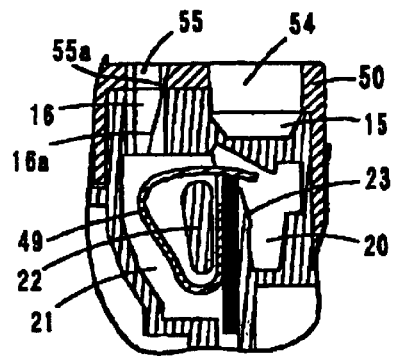
FIGS. 17A, 17B, 17C and 17D, together referred to as FIG. 17, show the connector of FIG 16, FIG. 17A being its partially sectional view, FIG. 17B being a diagonal view of a portion of the connector, FIG. 17C being a diagonal view of a portion of its base, and FIG. 17D being a diagonal view of a portion of its case.
Figure 17B:
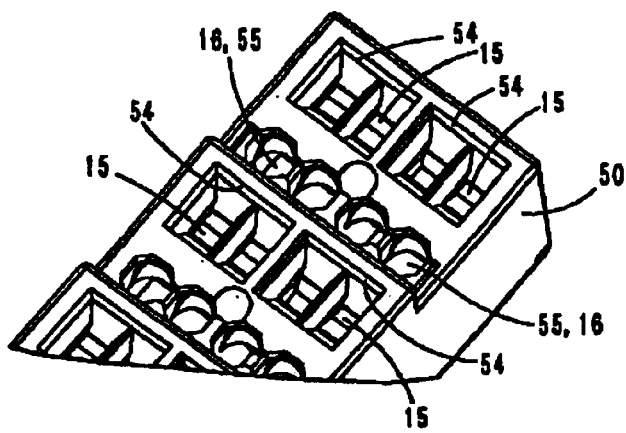
Figure 17C:
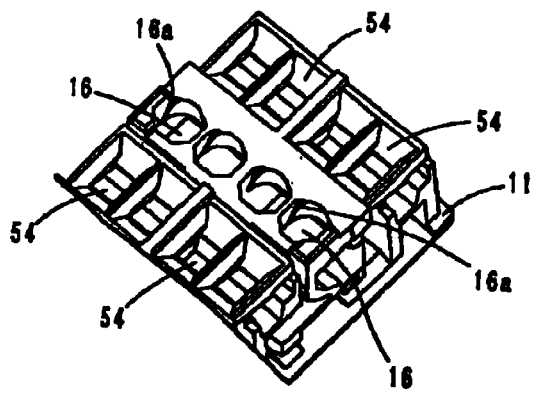
Figure 17D:
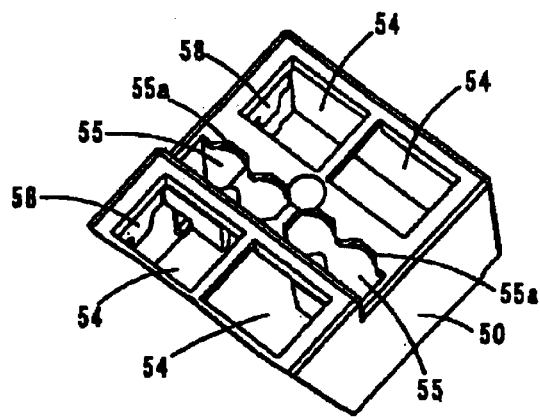
Figure 18A:
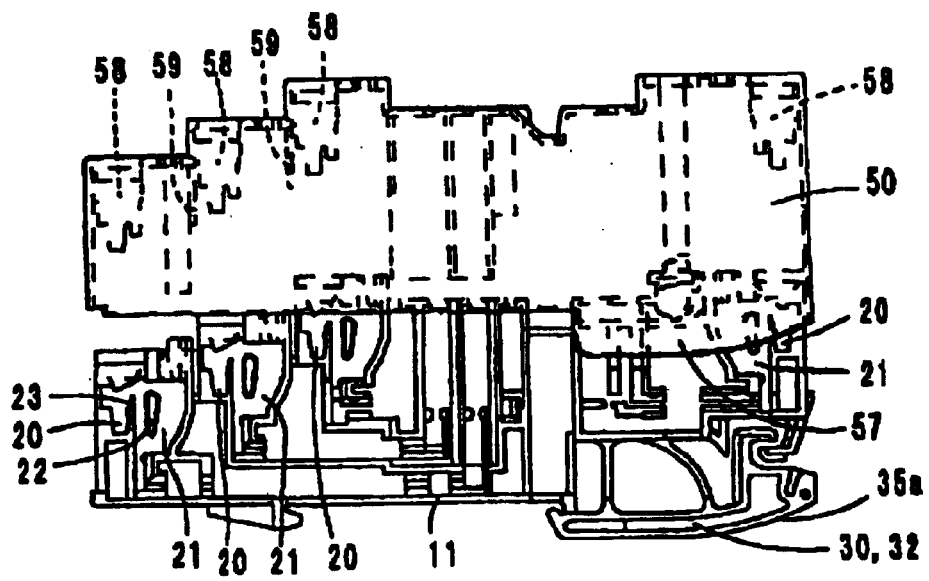
FIGS. 18A, 18B and 18C, together referred to as FIG. 18, show the connector of FIG. 16, FIG. 18A being its front view when its case is being engaged to its base, FIG. 18B being its front view after its case has been engaged to its base, and FIG. 18C being a sectional view taken along line 18C—18C of FIG. 18B.
Figure 18B:
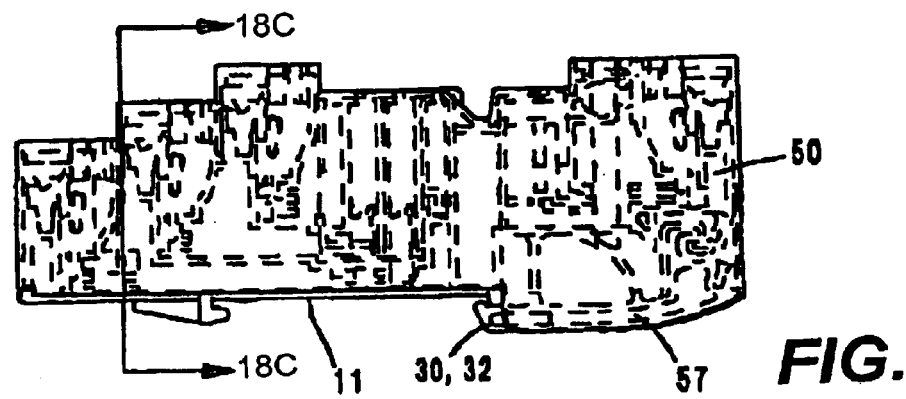
Figure 18C:
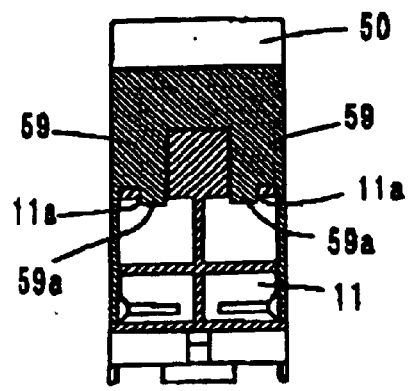

FIG. 13 relates to only one example of the lever 60 and is not intended to limit the scope of the invention. Many modifications and variations are possible within the scope of the invention. FIGS. 14A and 14B show a variation characterized as not having the attachment part 65 for a name plate. FIGS. 14C and 14D show another variation characterized as having no latches 68 protruding from the connecting arms 67. FIGS. 15A and 15B show still another variation characterized as having no connecting arms 67. As shown in FIGS. 15C and 15D, furthermore, the frame structure 66 need not be in the shape of a closed frame.

When the connector 10 is detachably mounted to a rail, the latch part 37 on the base 11 is engaged to one of the edge parts of the rail and the connector 10 as a whole is pressed against the rail. After the straight leg parts 33 and the arched leg part 34 are elastically deformed, they are returned to their original positions. As a result, the elongated downward protrusion 36 comes into contact with the other side edge of the rail and the protrusion 35d of the elastic hook 32 becomes engaged with the other side edge of the rail. The attachment to the rail is thus concluded.

When the rail, once attached, is removed from the connector 10, the tip of a tool such as a slotted screwdriver (not shown) is slid along the outwardly facing surface 31c from the opening 56 of the case 50 and positioned at the indentation 35c of the elastic hook 32 which is on the extension of the outwardly facing surface 31c, as explained above. The screwdriver is then operated so as to pull out the horizontal latch part 35 such that the straight and arched leg parts 33 and 34 are elastically deformed and the protrusion 35d becomes disengaged from the side edge of the rail and the connector 10 can be removed from the rail.

In summary, the connector 10 according to this invention can be set at any desired position on a rail by a single touch by a tool and can be removed equally easily. Since the elastic hook 32 is formed integrally as a single body with the base 11, the number of components to be assembled is small and the production process is not complicated.

Next, a method of connecting lead lines is explained with reference to FIG. 7 where the case 50 is not shown for the convenience of disclosure.

As the handling bar 80 is inserted into any of the handling bar holes 16 described above, it is guided along the guide surface 16a inside the hole 16 and positioned on a line tangent to the outer peripheral surface of the clamp spring 49. After the handling bar 80 is twisted to elastically deform the clamp spring 49, a lead line (not shown) is inserted into the connection hole 49a of the clamp spring 49 through the corresponding one of the lead line holes 15. As the handling bar 80 is thereafter pulled out of the handling bar hole 16, the clamp spring 49 is returned to the original position and the lead line is clamped between the clamp spring 40 and the corresponding one of the metal fittings (42 in FIG. 7). Similar operations are repeated such that even many lead lines can be easily connected.

For removing an inserted lead line, the handling bar 80 is inserted into the handling bar hole 16 along the guide surface 16a so as to compress and elastically deform the clamp spring 49 and to thereby release the clamping force on the lead line. The lead line is thereafter pulled out through the connection hole 49a of the clamp spring 49 and the handling bar 80 is thereafter pulled out.

FIGS. 16–19 relate to a second embodiment of this invention relating to a connector 10 for mounting a two-pole relay. According to this embodiment, as shown in FIG. 17, continuous guide surfaces 16a and 55a are formed in the handling bar holes 16 and 55 of its base 11 and case 50 for guiding the handling bar 80 to a desired position. Partition walls 16 with protrusions 59a are provided inside the case 50, as shown in FIG. 16 and engaging holes 11a are formed in the base 11 such that, as the protrusions 59a are inserted into the engaging holes 11a, the case 50 is prevented from warping outward and no gap is generated between the inner side surfaces of the case 50 and the outer side surfaces of the base 11. Thus, the structure is formed so as not to allow scraps of lead lines from falling off through such a gap. In other aspects, the structure is similar to the first embodiment and hence the description will be omitted.

Figure 19A:
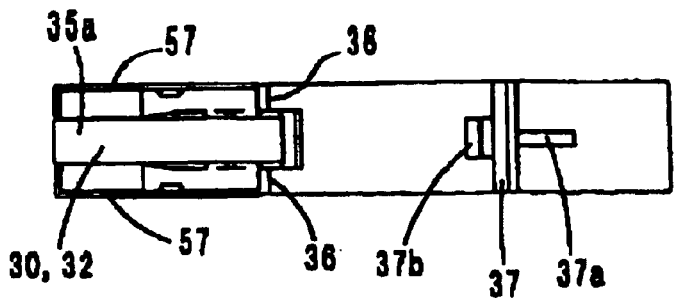
FIGS. 19A and 19B are respectively a bottom view and a diagonal view of the terminal shown in FIG. 16.
Figure 19B:
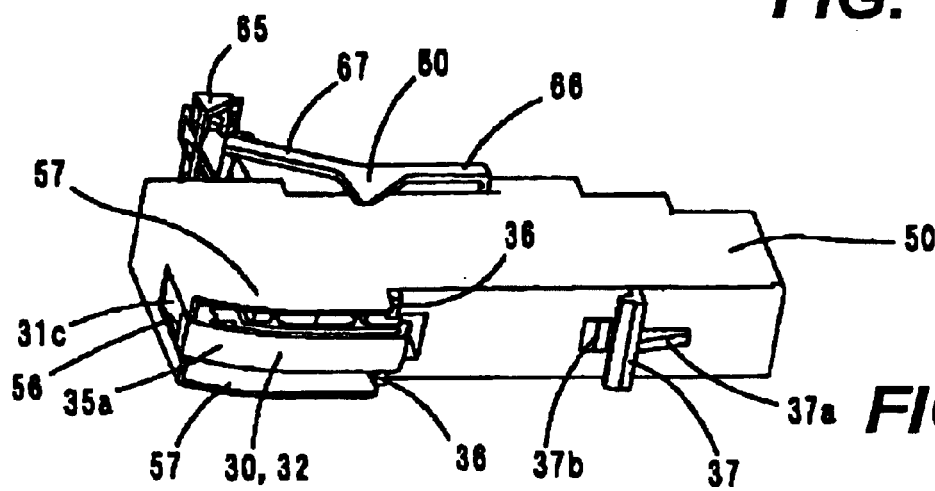
Figure 19C:
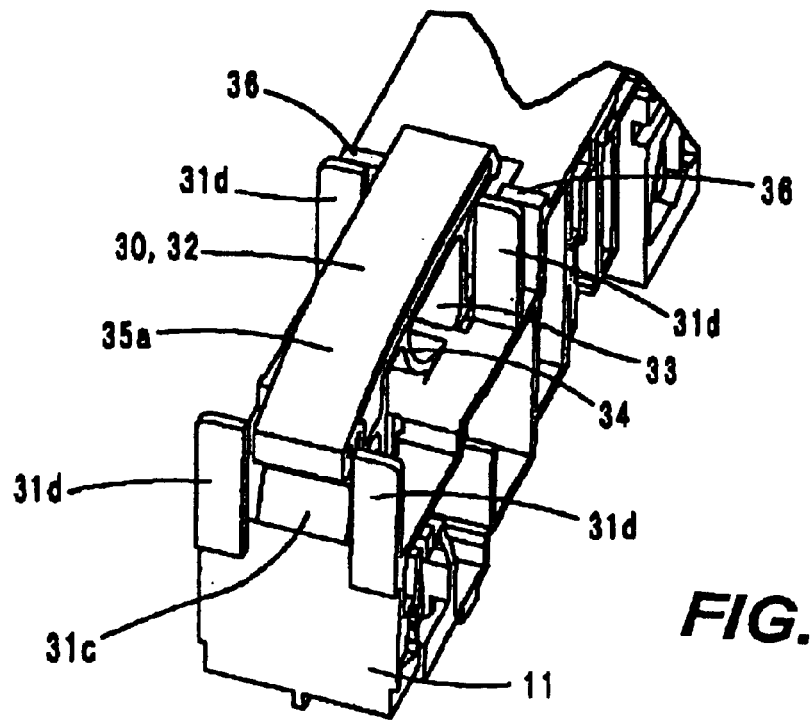
FIG. 19C is a diagonal view of a portion of another base.
Figure 20A:
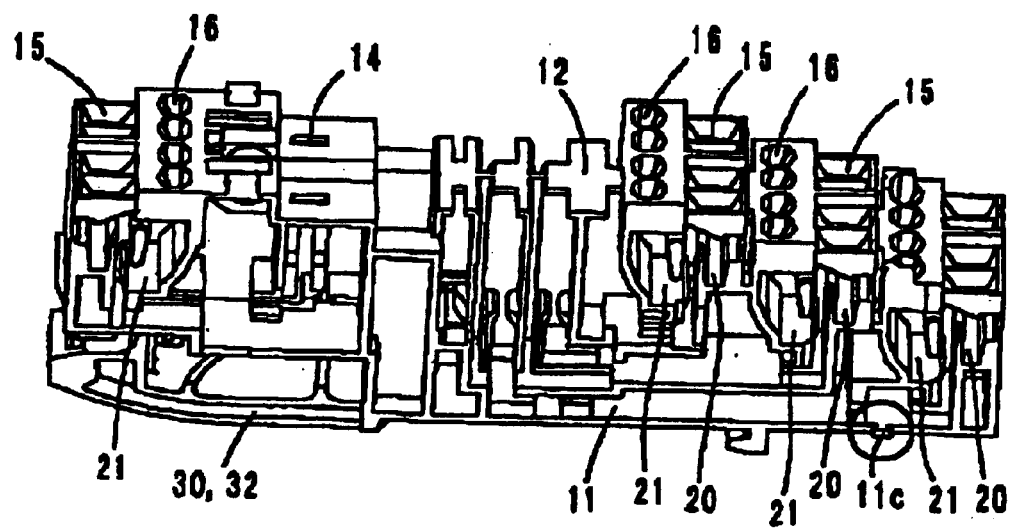
FIGS. 20A, 20B, 20C and 20D, together referred to as FIG. 20, show a connector according to a third embodiment of this invention, FIG. 20A being a diagonal view of its base, FIG. 20B being an enlarged view of a portion thereof, FIG. 20C being a diagonal view of its case, and FIG. 20D being an enlarged view of a portion thereof.
Figure 20B:
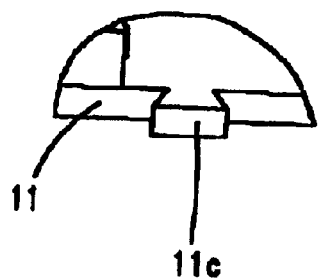
Figure 20D:
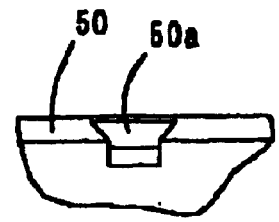
Figure 20C:
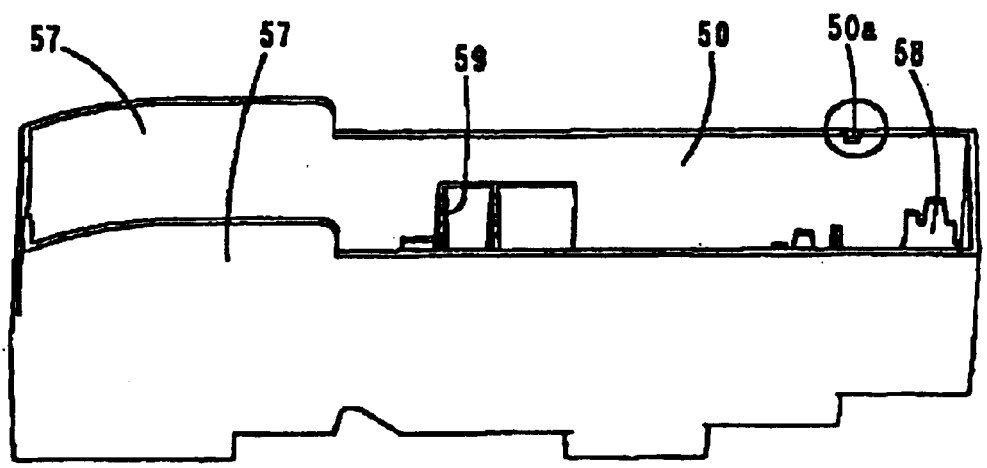
Figure 21A:
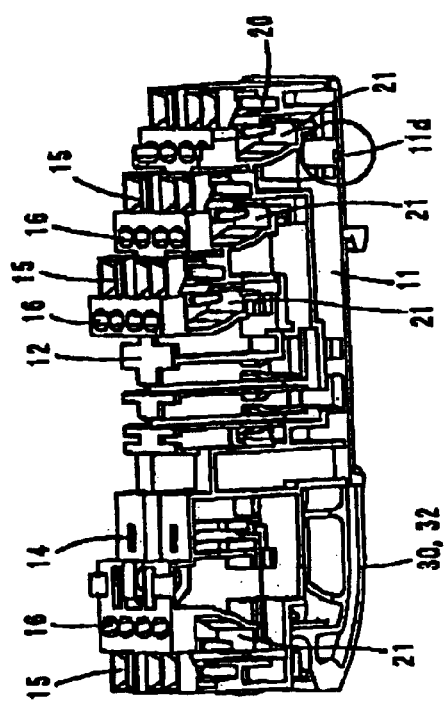
FIGS. 21A, 21B, 21C and 21D, together referred to as FIG. 21, show a connector according to a fourth embodiment of this invention, FIG. 21A being a diagonal view of its base, FIG. 21B being an enlarged view of a portion thereof, FIG. 21C being a diagonal view of its case, and FIG. 21D being an enlarged view of a portion thereof.
Figure 21B:
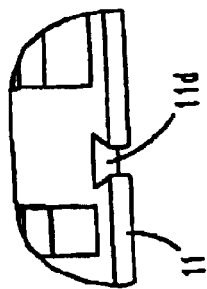
Figure 21C:
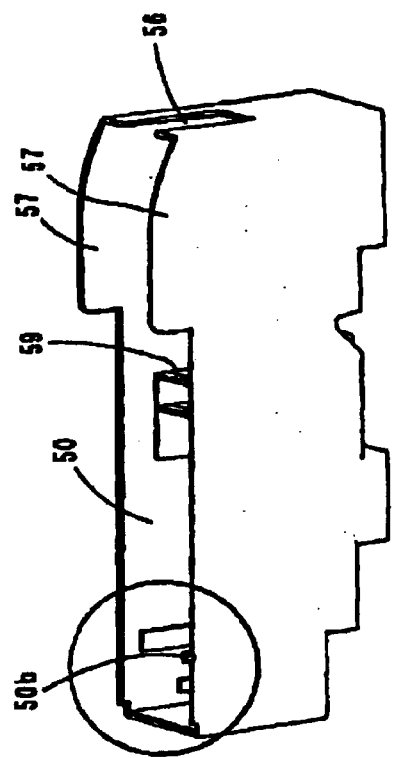
Figure 21D:
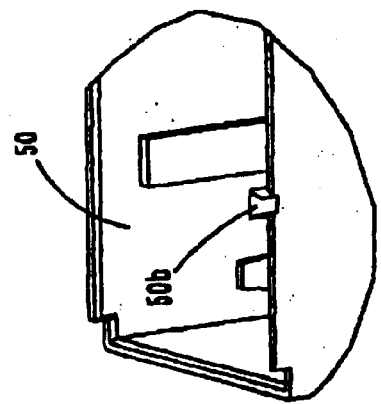
Figure 22:
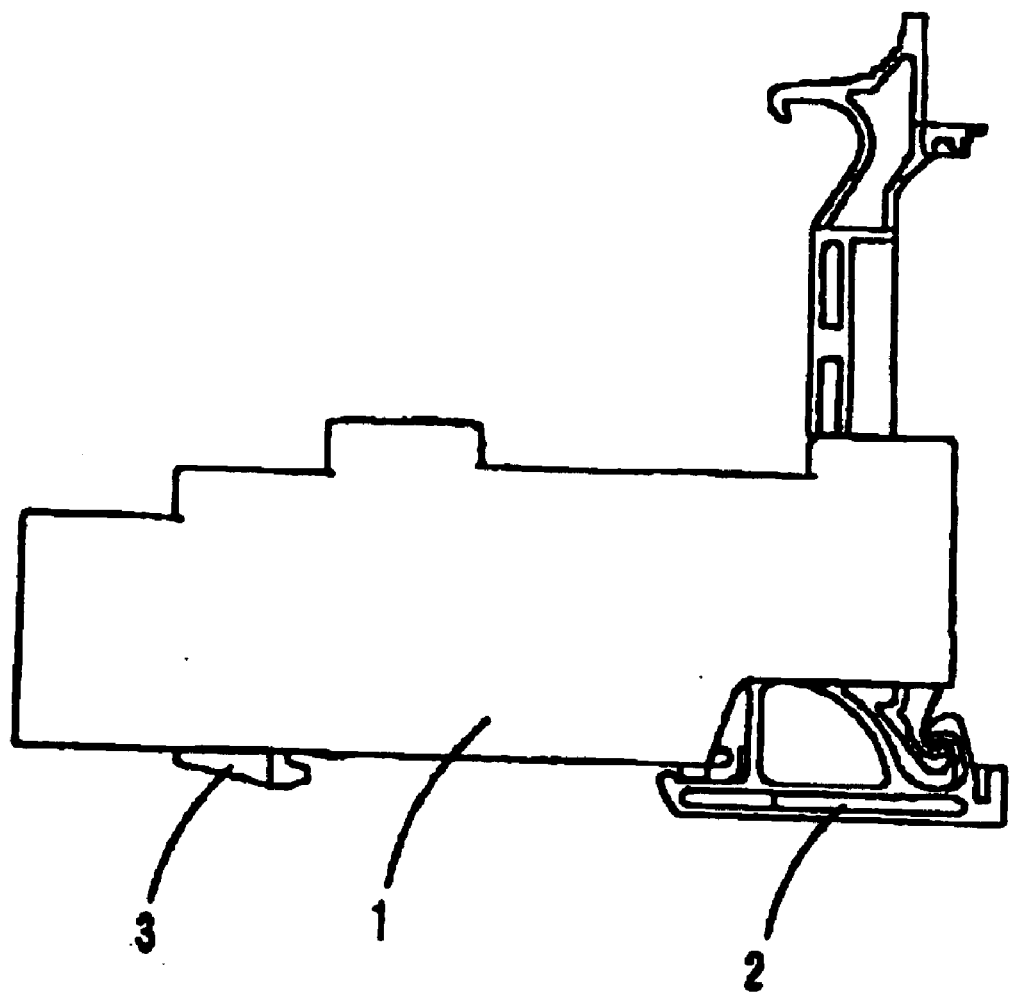
FIG. 22 is a side view of a prior art connector for an electric apparatus for explaining the method of using it.

As a variation of the second embodiment, protruding support members 31d may be provided at the stepped part 31 of the base 11, as shown in FIG. 19C, for controlling the twisting deformation of the elastic hook 32. This variation is advantageous because the twisting kind of deformation of the elastic hook 32 can be more dependably controlled and the elastic hook 32 is less likely to be damaged.

FIG. 20 shows a third embodiment of the invention characterized as having a wedge-shaped protrusion 11c on the base 11 and an engaging indentation 50a at the open edge portion of the case 50. As the wedge-shaped protrusion 11c is engaged in this indentation 50a, the side wall of the case 50 can be prevented from warping outward.

FIG. 21 shows a fourth embodiment of the invention characterized as having a wedge-shaped cut 11d on the base 11 and an engaging protrusion 50b on the edge portion of the opening in the case 50. As the wedge-shaped cut 11d is engaged with the engaging protrusion 50b of the case 50, the side wall of the case 50 is likewise prevented from warping outward.

The aforementioned third and fourth embodiments of the invention are advantageous in that no gap is formed between the inner side surface of the case 50 and the outer side surface of the base 11 and hence no scrap of lead lines can fall out therethrough. This serves to prevent short circuits and to improve the insulating characteristics. Although examples were shown above wherein the base 11 and the case 50 are separate components, the base and the case may be integrally formed.

In summary, the present invention provides connectors which may be dropped accidentally but its elastic hook is not likely to be broken because it is well protected and hence the elastic hook need not be made of a nylon resin material. The freedom in design is increased and the designing becomes easier.

What is claimed is:

1. A connector for an electric apparatus, said connector comprising:

a case having lower edge parts;

a base with a bottom surface, having an elastic hook and a latch formed integrally as a single body with said base on said bottom surface, said elastic hook and said latch serving to engage both edge parts of a rail so as to mount said connector removably to said rail; and at least one protrusion on said bottom surface between said extended members and said elastic hook for limiting twisting deformation of said elastic hook;

wherein said case has extended members extending from said lower edge parts for protectingly covering both side surfaces of said elastic hook.

2. The connector of claim 1 wherein said elastic hook has a bottom surface, a portion of said bottom surface of said elastic hook being arcuately curved.

3. The connector of claim 1 wherein said case has four side surfaces, two of said side surfaces each having one of said extended members, one of the other side surfaces having an opening allowing a tool to be passed therethrough to operate on said elastic hook.

4. The connector of claim 1 wherein said case and said base are detachably engageable to each other.

5. A connector for an electric apparatus, said connector comprising:

a case having lower edge parts; and a base with a bottom surface, having an elastic hook and a latch formed integrally as a single body with said base on said bottom surface, said elastic hook and said latch serving to engage both edge parts of a rail so as to mount said connector removably to said rail;

wherein said case has extended members extending from said lower edge parts for protectingly covering both side surfaces of said elastic hook;

wherein said case has four side surfaces, two of said side surfaces each having one of said extended members, one of the other side surfaces having an opening allowing a tool to be passed therethrough to operate on said elastic hook; and wherein side surfaces of said elastic hook contact edge parts of said opening and thereby prevent said elastic hook from being twisted.

6. The connector of claim 5 wherein said elastic hook has a bottom surface, a portion of said bottom surface of said elastic hook being arcuately curved.

7. The connector of claim 5 wherein said case has four side surfaces, two of said side surfaces each having one of said extended members, one of the other side surfaces having an opening allowing a tool to be passed therethrough to operate on said elastic hook.

8. The connector of claim 5 wherein said case and said base are detachably engageable to each other.

9. A connector for an electric apparatus, said connector comprising:

a case having lower edge parts; and a base with a bottom surface, having an elastic hook and a latch formed integrally on said bottom surface, said elastic hook and said latch serving to engage both edge parts of a rail so as to mount said connector removably to said rail;

said case having extended members extending from said lower edge parts for protectingly covering both side surfaces of said elastic hook;

said case having four side surfaces, two of said side surfaces each having one of said extended members, one of the other side surfaces having an opening allowing a tool to be passed theretbrough to operate on said elastic hook;

said base having an indentation and an outward facing guide surface for guiding said tool to said indentation for operating on said elastic hook, said outward facing guide surface being visible through said opening.

10. The connector of claim 9 wherein said case and said base are detachably engageable to each other.

\* \* \* \* \*